US007236124B2

(12) United States Patent
Adams et al.

(10) Patent No.: US 7,236,124 B2
(45) Date of Patent: Jun. 26, 2007

(54) RADAR SYSTEM AND METHOD FOR REDUCING CLUTTER IN A HIGH-CLUTTER ENVIRONMENT

(75) Inventors: Vinh Adams, Tucson, AZ (US); Wesley Dwelly, Tucson, AZ (US); Robert J. Adams, Tucson, AZ (US)

(73) Assignee: Raytheon Company, Tucson, AZ (US)

( * ) Notice: Subject to any disclaimer, the term of this patent is extended or adjusted under 35 U.S.C. 154(b) by 215 days.

(21) Appl. No.: 11/143,045

(22) Filed: Jun. 2, 2005

(65) Prior Publication Data

US 2006/0273951 A1 Dec. 7, 2006

(51) Int. Cl.
*G01S 13/52* (2006.01)
*G01S 13/00* (2006.01)

(52) U.S. Cl. .................. 342/162; 342/159; 342/82

(58) Field of Classification Search ........ 342/159–163, 342/82, 16
See application file for complete search history.

(56) References Cited

U.S. PATENT DOCUMENTS

| 4,766,435 | A  | * | 8/1988  | Wells ........................ 342/82      |
| 4,901,082 | A  | * | 2/1990  | Schreiber et al. ............. 342/89    |
| 5,121,125 | A  | * | 6/1992  | Guerci et al. ................ 342/204   |
| 5,262,785 | A  | * | 11/1993 | Silverstein et al. ......... 342/162     |
| 5,311,192 | A  | * | 5/1994  | Varga et al. ................. 342/188   |
| 5,486,833 | A  | * | 1/1996  | Barrett ....................... 342/204  |
| 5,760,732 | A  | * | 6/1998  | Marmarelis et al. ........ 342/145       |
| 6,531,976 | B1 | * | 3/2003  | Yu ............................ 342/16   |
| 6,861,974 | B1 | * | 3/2005  | Poe et al. ................... 342/127   |
| 6,867,731 | B2 | * | 3/2005  | Dizaji et al. ................ 342/159   |
| 7,132,977 | B1 | * | 11/2006 | Pillai ........................ 342/90   |
| 2003/0048214 | A1 | * | 3/2003 | Yu ............................ 342/16   |
| 2003/0210179 | A1 | * | 11/2003 | Dizaji et al. ............... 342/159    |
| 2003/0218565 | A1 | * | 11/2003 | Budic ....................... 342/90     |
| 2004/0150555 | A1 | * | 8/2004 | Walton ...................... 342/195     |
| 2004/0178951 | A1 | * | 9/2004 | Ponsford et al. ............ 342/192      |
| 2005/0134500 | A1 | * | 6/2005 | Pillai ........................ 342/90    |
| 2006/0033656 | A1 | * | 2/2006 | Budic ........................ 342/195    |
| 2006/0273951 | A1 | * | 12/2006 | Adams et al. .............. 342/159      |
| 2007/0036202 | A1 | * | 2/2007 | Ge et al. .................... 375/141    |

* cited by examiner

OTHER PUBLICATIONS

Garren D A et al: Enhanced target detection and Identification via optimised radar transmission pulse shape IEE Proceeding: Radar, Sonar & Navigation, Institution of Engineers. GB. vol. 148. No. 3, Jun. 1, 2001 pp. 130-138 XP006017088 ISSN: 1350-2395 Section 2.2: Matrix forulation of optimised Target Detection, p. 131; Equations (10), (31).

*Primary Examiner*—Thomas H. Tarcza
*Assistant Examiner*—Shelley Chen
(74) *Attorney, Agent, or Firm*—Gregory J. Gorrie; Schwegman, Lundberg, Woessner & Kluth, P.A.

(57) ABSTRACT

A radar system transmits an environment-sensing pulse and processing circuitry time-reverses an order of radar return samples and generates a convolution matrix from the radar return samples resulting from a transmission of the environment-sensing pulse. The processing circuitry may also generate a plurality of return energy-ranked vectors from a decomposition of the convolution matrix. The processing circuitry may select one of the return energy-ranked vectors for generation of a clutter-orthogonal transmit waveform. In some embodiments, the processing circuitry may select a clutter-orthogonal vector from the plurality of return energy-ranked vectors and may quantize the clutter-orthogonal vector for application to the phase modulator for generation of the clutter-orthogonal transmit waveform. The radar system may perform multiple correlations on sampled radar returns from the clutter orthogonal transmit waveform using a family of pseudo-orthogonal waveforms to detect a slow-moving target.

33 Claims, 6 Drawing Sheets

US 7,236,124 B2

RADAR SYSTEM AND METHOD FOR REDUCING CLUTTER IN A HIGH-CLUTTER ENVIRONMENT

GOVERNMENT RIGHTS

The United States Government may have rights in this invention as provided under contract N66001-04-C-8008 awarded by the Defense Advanced Research Project Agency (DARPA).

TECHNICAL FIELD

Embodiments of the present invention pertain to radar systems and methods of identifying targets in high-clutter environments.

BACKGROUND

One difficultly with many conventional radar systems is distinguishing slow-moving targets, such as a person or vehicle, from clutter. The low-frequency response associated with a slow-moving target generates a low-Doppler frequency and may require the use of complex filters. The use of short pulses to reduce the returns from clutter generally requires a high sampling bandwidth which is generally outside the range of most analog-to-digital converters.

Some conventional radar systems use swept frequency radar to help distinguish slow-moving objects from clutter. These swept frequency radars employ a mixing technique to convert range to frequency to preserve high-bandwidths and fine-range resolution. One problem is that these high-bandwidths require long frequency sweeps creating a minimum standoff range. In some cases, to help overcome this problem, the frequency sweep may be gated to create a stepped frequency radar, however these radars are easy to jam and generally do not have the dynamic range necessary to detect slow-moving targets. Thus, there are general needs for radar systems and methods that reduce the effects of clutter and are able to detect slow-moving targets.

SUMMARY

A radar system transmits an environment-sensing pulse and processing circuitry time-reverses an order of radar return samples and generates a convolution matrix from the radar return samples resulting from a transmission of the environment-sensing pulse. The processing circuitry may also generate a plurality of return energy-ranked vectors from a decomposition of the convolution matrix. The processing circuitry may select one of the return energy-ranked vectors for generation of a clutter-orthogonal transmit waveform. In some embodiments, the processing circuitry may select a clutter-orthogonal vector from the plurality of return energy-ranked vectors and may quantize the clutter-orthogonal vector for application to the phase modulator for generation of the clutter-orthogonal transmit waveform. In some embodiments, the selected vector may be a vector of an input singular vector matrix (V) associated with a lowest return energy level. The clutter-orthogonal transmit waveform is transmitted and multiple correlations may be performed on sampled radar returns using a family of pseudo-orthogonal waveforms to detect a slow-moving target.

DETAILED DESCRIPTION

Figure 1:
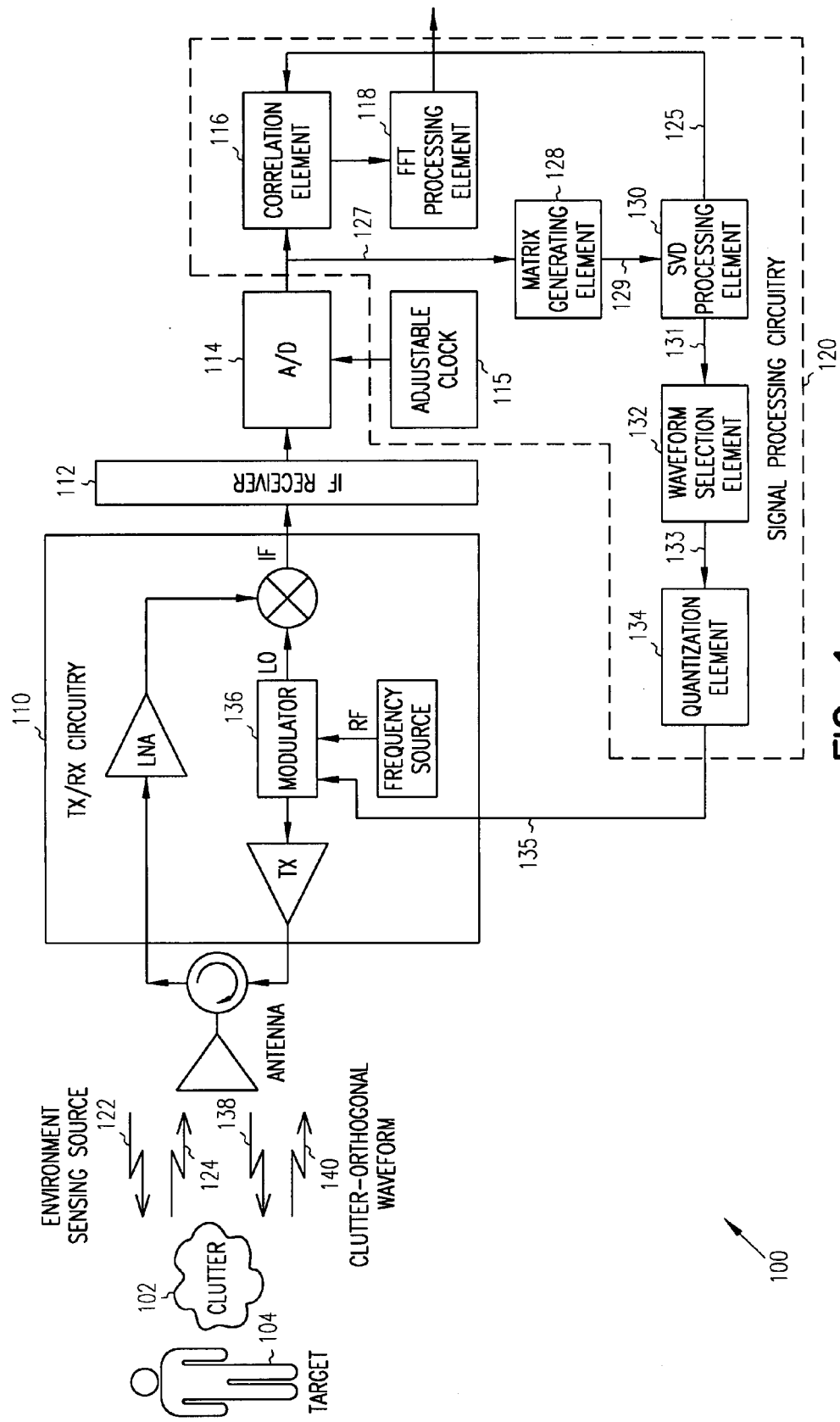
FIG. 1 illustrates a block diagram of a radar system in accordance with some embodiments of the present invention.

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Advancements in radar technology for surveillance and tactical operations are required to address more challenging search and detection requirements. Moving target detection in severe clutter environments remains a key challenge. Modular and digital radar payloads are important to help reduce system costs. A key challenge for radar systems is the operation of the sampling circuitry (e.g., an analog-to-digital converter), which generally needs to operate at high-frequencies and with sufficient bandwidth, linearity and dynamic range to quantize both target and severe radar clutter. Though analog-to-digital converter technology is developing, it has not yielded a sufficiently digital radar front-end with adequate bandwidth and dynamic range for tactical operations and surveillance of slow-moving targets.

Embodiments of the present invention provide a radar system that uses a clutter-orthogonal waveform to reduce high-clutter levels before the return signals enter the sampling circuitry. This allows the sampler to concentrate its dynamic range on changes in the environment and deemphasize the static portions of the environment. In some embodiments, multiple correlations are performed on the radar returns to provide pulse-compression with reduced range side lobes. The combination of a clutter-orthogonal transmit waveform and the performance of multiple correlations allows the radar system to image environmental changes, such as human moving in a high-clutter area. In some embodiments, a very short pulse may be initially transmitted as an environment-sensing waveform to characterize the impulse response of the clutter. A waveform generation process generates a clutter-orthogonal transmit waveform from the sampled returns of the environment-sensing waveform.

In some embodiments, an adaptive waveform matrix is generated from time-reversed returns of the sensing waveform and a decomposition process is performed on the matrix to generate an input singular vector matrix. An optimum sensitivity transmit waveform may be selected from the input singular vector matrix for generating a clutter-orthogonal transmit waveform. The clutter-orthogonal transmit waveform may be quantized as either bi-phase or polyphase, and may be transmitted using either a bi-phase or polyphase modulator. Polyphase modulation may provide better performance for lower transmit bandwidths, although the scope of the invention is not limited in this respect.

In some embodiments, the present invention provides a see-through-the-wall (STTW) radar that provides the capability to detect, identify, locate and classify objects behind walls or other objects. Some embodiments of the present invention may be deployed by soldiers or robotic assets, (e.g., air or ground assets) to provide detailed information on occupied or unoccupied battlespace. Some embodiments of the present invention may be deployed by homeland security personnel to detect and classify persons in highly-cluttered urban or highly-cluttered rural areas.

FIG. 1 illustrates a block diagram of a radar system in accordance with some embodiments of the present invention. Radar system 100 may detect target 104 within clutter 102 by initially transmitting environment-sensing waveform 122 and charactering clutter 102 based on return 124. Radar system 100 may also generate and transmit clutter-orthogonal transmit waveform 138 and perform one or more correlations on return 140 to detect a slow-moving target, such as target 104.

Radar system 100 may comprise signal processing circuitry 120 which may include matrix-generating element 128 to time-reverse an order of radar return samples 127 and to generate convolution matrix 129 from radar return samples 127. The radar return samples may result from a transmission of environment-sensing waveform 122. Signal processing circuitry 120 may also comprise matrix-processing element 130 to generate a plurality of return energy-ranked vectors 131 (e.g., the V matrix discussed below) from convolution matrix 129. One of return energy-ranked vectors 131 may be selected, quantized and applied to phase modulator 136 for generation of clutter-orthogonal transmit waveform 138.

Signal processing circuitry 120 may also comprise correlator 116 to perform multiple correlations on sampled radar returns 140 from the clutter orthogonal transmit waveform 138 using a family of waveforms 125.

Signal processing circuitry 120 may also comprise waveform-selection element 132 to select a clutter-orthogonal vector from the plurality of return energy-ranked vectors, and quantization element 134 to quantize clutter-orthogonal vector 133 for application to phase modulator 136 for generation of clutter-orthogonal transmit waveform 138. In some embodiments, the clutter-orthogonal vector may have a lowest energy return and may be the last vector (e.g., generally the last column) in a V matrix (discussed in more detail below), although the scope of the invention is not limited in this respect.

In some embodiments, quantization element 134 may quantize clutter-orthogonal vector 133 by setting amplitude components of clutter-orthogonal vector 133 to a constant-amplitude level, and truncating phase components of clutter-orthogonal vector 133 based on a resolution of phase-modulator 136. In some embodiments, setting the amplitude components of clutter-orthogonal vector 133 may include selecting a constant value for the amplitude components. In some embodiments, truncating the phase components may include reducing the number or rounding-off the phase components based on the resolution of phase-modulator 136. In these embodiments, quantization element 134 may generate quantized clutter-orthogonal vector 135 for application to phase modulator 136.

In some embodiments, phase-modulator 136 may comprise a bi-phase modulator and quantization element 134 may generate two phase components from clutter-orthogonal vector 133. In other embodiments, phase modulator 136 comprises a polyphase modulator and quantization element 134 generates a plurality of phase components (e.g., up to several thousand or more) based on the resolution of the control of the polyphase modulator. In some embodiments, phase modulator 136 may comprise a 10-bit polyphase modulator which may be suitable for use in a system having up to a 500 MHz sampling A/D bandwidth or greater. In some embodiments, when phase modulator 136 is a bi-phase modulator, a sampling bandwidth of up to 2 GHz or greater may be used. The sampling bandwidth of sampling element 114 is not required to correspond to the bandwidth of the transmit signal.

In some embodiments, the time-reversal performed by matrix-generating element 128 may reverse the order of radar return samples 127 and matrix-generating element 128 may generate a convolution matrix of radar return samples 127 from environment-sensing waveform 122. In some embodiments, convolution matrix 129 may be viewed as a matrix of a convolution of radar return samples as they were received in time, although the scope of the invention is not limited in this respect. The convolution matrix may also be viewed as an environmental matrix representing clutter 102. In some embodiments, radar return samples 127 may comprise digital I and Q data. In some embodiments, radar return samples 127 may comprise a vector, and matrix-generating element 128 may reverse the order of the elements of this vector, although the scope of the invention is not limited in this respect.

In some embodiments, matrix-processing element 130 may perform a decomposition on convolution matrix 129 to generate one or more decomposition matrices. In these embodiments, waveform-selection element 132 may select clutter-orthogonal vector 133 from one of the decomposition matrices. The selected vector may have the lowest return energy level, although the scope of the invention is not limited in this respect.

In some embodiments, the decomposition performed by matrix-processing element 130 may be a singular-value decomposition (SVD), although the scope of the invention is not limited in this respect. In these embodiments, the decomposition matrices may comprise a singular-value diagonal matrix, generally referred to as the S-matrix, an output singular vector matrix generally referred to as the U matrix, and an input singular vector matrix referred to as the V-matrix. In these embodiments, waveform-selection element 132 may select a vector (e.g., the last or one of the last columns) as clutter-orthogonal vector 133 from the input singular vector matrix (V). The selected vector may be associated with a lowest return energy level, although the scope of the invention is not limited in this respect. In some embodiments, the vectors (e.g., columns) of the V matrix may be ranked or ordered in terms of the return energy level with the first vector having the highest return energy level and the last vector having the lowest return energy level. In other words, each vector of the V matrix may have a different gain associated therewith.

In some embodiments, convolution matrix 129 may be formed from a vector such that the inner product of the convolution matrix with another vector is the convolution of the two vectors. In some embodiments, an SVD is applied to the convolution matrix to generate the input singular vector matrix (V). In these embodiments, an optimum sensitivity transmit waveform is selected from the V matrix for clutter orthogonality and environment change detections. In some embodiments, the waveform with the most clutter rejection and sensitivity to change is the last vector in the V matrix, although the scope of the invention is not limited in this respect.

In some embodiments, the vector selected as clutter-orthogonal vector 133 may be a vector of one of the SVD decomposition matrices associated with the smallest singular-value and may be associated with lowest clutter return level, although the scope of the invention is not limited in this respect. Although embodiments of the present invention are discussed herein with respect to selection of vectors associated with columns, the scope of the invention is not limited in this respect. The use of columns and rows are for convenience and is not meant to be limiting in any way. In this way, the terms columns and rows may be interchanged depending on how a matrix is generated and manipulated.

In some embodiments, the family of waveforms 125 used for multiple correlations may comprise at least some vectors from the selected one of the decomposition matrices, although the scope of the invention is not limited in this respect. In some embodiments, the family of waveforms 125 comprises at least some or all vectors of the V matrix, although the scope of the invention is not limited in this respect. In some other embodiments, the family of waveforms 125 may comprise a family of pseudo-orthogonal waveforms. In some embodiments, family of waveforms 125 may comprise Walsh-matrix waveforms, although other pseudo-orthogonal waveforms may also be suitable. In yet other embodiments, the family of waveforms 125 may comprise at least some or all vectors of the U matrix, although the scope of the invention is not limited in this respect.

Radar system 100 also comprises sampling circuitry 114 to sample the radar returns from the transmission of sensing waveform 122 and to generate radar return samples 127. Sampling circuitry 114 may comprise analog-to-digital converter circuitry. In some embodiments, sampling circuitry 114 may sample radar returns 124 from sensing waveform 122 at time-intervals corresponding to a pulse-width of sensing waveform 122. In some embodiments, sensing waveform 122 may be a short pulse and may be on the order of two nanoseconds (ns) or less for a sampling bandwidth of between 500 MHz and 2 GHz, although the scope of the invention is not limited in this respect. The use of a short pulse may allow the sampling of the environment at various points to get an accurate representing of clutter 102. In some embodiments, the use of a short pulse may allow return signal 124 to approach the impulse response of the environment. In this way, the static environment may be accurately characterized.

Radar system 100 may also comprise transmitter/receiver (TX/RX) circuitry 110 to transmit waveforms and receive waveforms. TX/RX circuitry 110 may transmit sensing waveform 122 and may receive radar returns 124. In some embodiments, TX/RX circuitry 110 may operate within Ka band, although the scope of the invention is not limited in this respect.

Radar system 100 may also comprise other functional elements such as intermediate frequency (IF) receiver 112 and fast Fourier transform (FFT) processing element 118. IF receiver 112 may receive IF signals from TX/RX circuitry 110 and provide baseband samples to sampler 114. FFT processing element 118 may perform Fourier transforms on correlation outputs from correlation element 116 to generate frequency-domain signals that may be used to identify and/or classify target 104.

In some embodiments, the transmitter waveform bandwidth may be greater than the bandwidth of sampling circuitry 114. In these embodiments, adjustable clock circuitry 115 may provide sampling circuitry 114 an equivalent finer range resolution by adjusting the sampling clock phase, although the scope of the invention is not limited in this respect.

In some embodiments, matrix-generating element 128, matrix-processing element 130, waveform-selection element 132 and quantization element 134 of signal processing circuitry 120 may comprise software and/or firmware operating within one or more processing elements such as one or more microprocessors. Although radar system 100 is illustrated as having several separate functional elements, one or more of the functional elements may be combined and may be implemented by combinations of software-configured elements, such as processing elements including digital signal processors (DSPs), and/or other hardware elements. For example, some elements of signal processing circuitry 120 may comprise one or more microprocessors, DSPs, application specific integrated circuits (ASICs), and combinations of various hardware and logic circuitry for performing at least the functions described herein. In some embodiments, the functional elements of radar system 100 may refer to one or more processes operating on one or more processing elements.

Figure 2:
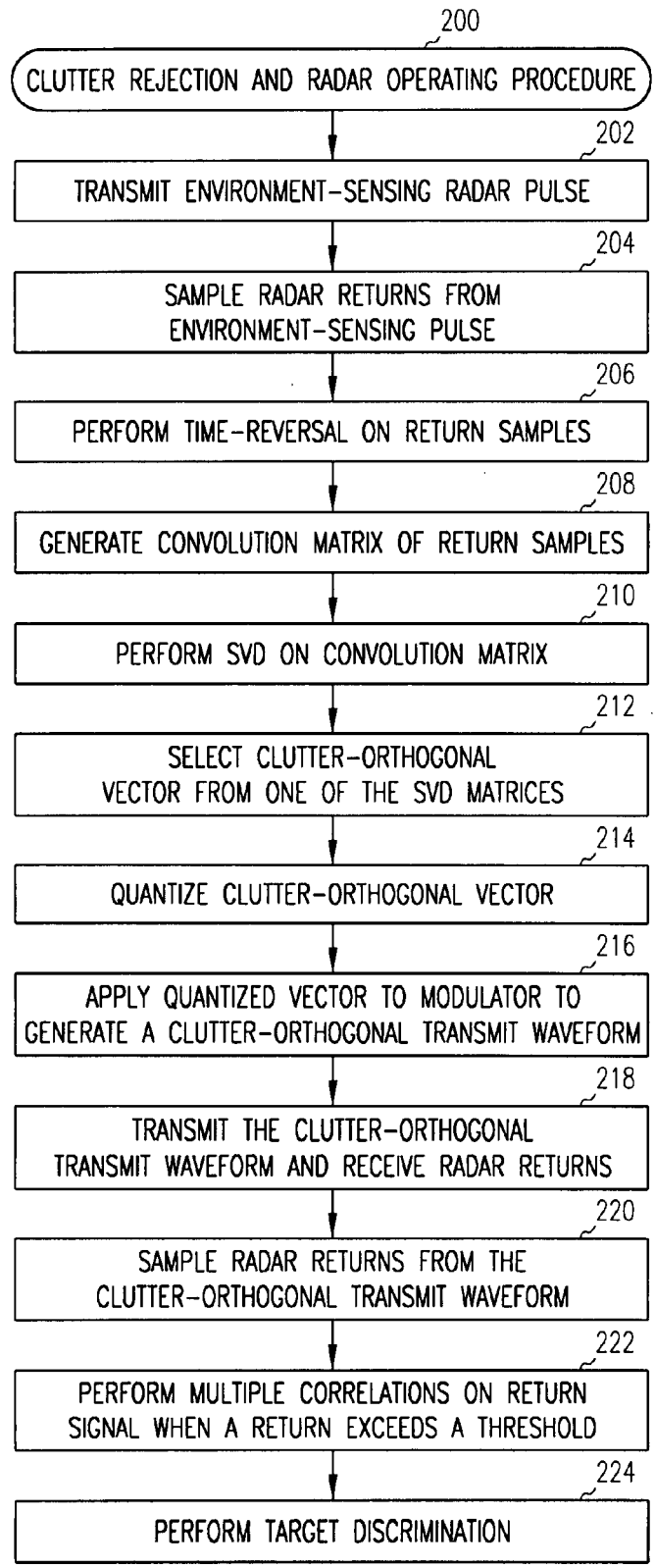
FIG. 2 is a flow chart of a clutter rejection and radar operating procedure in accordance with some embodiments of the present invention.

FIG. 2 is a flow chart of a clutter rejection and radar operating procedure in accordance with some embodiments of the present invention. Clutter rejection and radar operating procedure 200 may be performed radar system 100 although other systems may also be suitable for performing procedure 200.

Operation 202 comprises transmitting an environment-sensing waveform, such as waveform 122 (FIG. 1). Operation 202 may be performed by TX/RX circuitry 110 (FIG. 1).

Operation 204 comprises sampling radar returns, such as returns 124 (FIG. 1) from the environment-sensing waveform. Operation 204 may be performed by sampling element 114 (FIG. 1).

Operation 206 comprises performing a time-reversal on the return samples generated in operation 204.

Operation 208 comprises generating a convolution matrix from the return samples generated in operation 204. In some embodiments, operation 208 may generate the convolution matrix using the time-reversed samples from operation 206, although operations 206 and 208 may be performed in any order. Operations 206 and 208 may be performed by matrix-generating element 128 (FIG. 1).

Operation 210 comprises performing a decomposition, such as an SVD, on the convolution matrix generated in operation 208 to generate one of more decomposition matrices. Operation 210 may be performed by element 130 (FIG. 1).

Operation 212 comprises selecting a clutter-orthogonal vector from one of the decomposition matrices generated in operation 210. In some embodiments, a vector from an input singular vector matrix (V) having a lowest return energy level may be selected, although the scope of the invention is not limited in this respect. Operation 212 may be performed by waveform-selection element 132 (FIG. 1).

Operation 214 comprises quantizing the clutter orthogonal vector selected in operation 212 to generate a vector of constant amplitude and a number of phases based on phase-modulator 136 (FIG. 1). Operation 214 may be performed by quantization element 134 (FIG. 1).

Operation 216 comprises applying the quantized clutter-orthogonal vector from operation 214 to the phase-modulator for generating a clutter-orthogonal transmit waveform, such as clutter-orthogonal transmit waveform 138 (FIG. 1).

Operation 218 comprises transmitting the clutter-orthogonal transmit waveform and receiving the radar returns from the clutter-orthogonal transmit waveform. Operation 218 may be performed by TX/RX circuitry 110 (FIG. 1) in conjunction with a radar antenna and a circulator, although the scope of the invention is not limited in this respect.

Operation 220 comprises sampling the radar returns from the clutter-orthogonal transmit waveform to generate samples. Operation 220 may be performed by sampler 114 (FIG. 1).

Operation 222 comprises performing multiple correlations on the sampled returns generated in operation 220. In some embodiments, correlations may be performed only when the samples exceed a predetermined threshold. In some embodiments, operation 222 may use waveforms, such as pseudo-orthogonal waveforms or waveforms corresponding to vectors of the selected decomposition matrix (e.g., the V matrix) for correlating the sampled returns. Operation 222 may be performed by correlation element 116 (FIG. 1).

Operation 224 comprises performing a Fourier transform on the correlation outputs from operation 222 and performing target discrimination to identify and/or classify a target.

Although the individual operations of procedure 200 are illustrated and described as separate operations, one or more of the individual operations may be performed concurrently, and nothing requires that the operations be performed in the order illustrated.

Figure 3A:
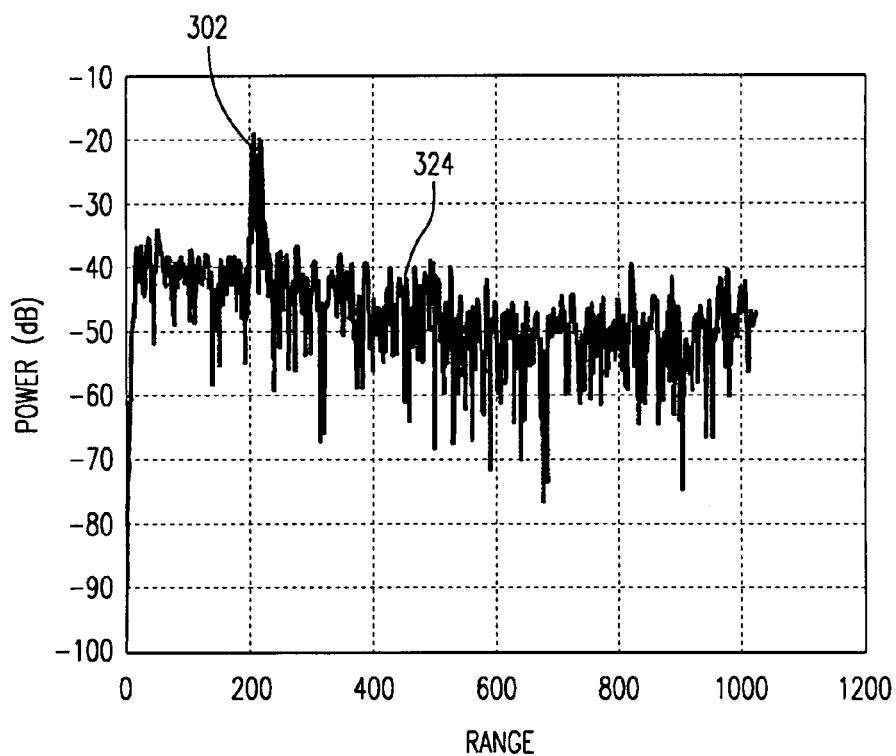
FIG. 3A illustrates returns from an environment-sensing waveform in accordance with some embodiments of the present invention.
Figure 3B:
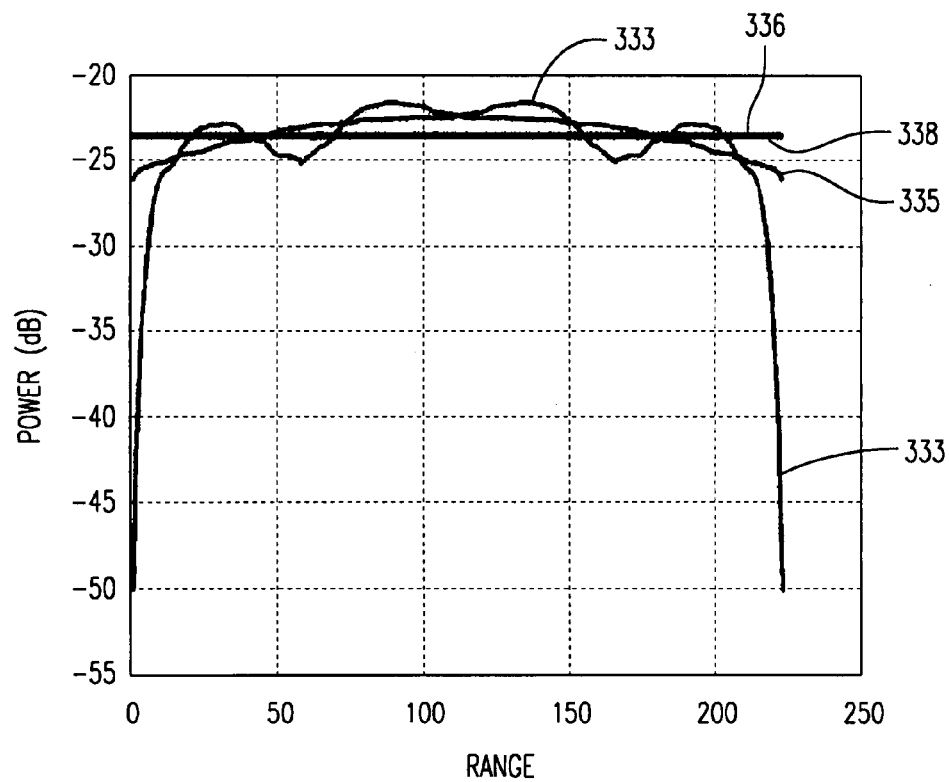
FIG. 3B illustrates clutter-orthogonal waveforms in accordance with some embodiments of the present invention.

FIG. 3A illustrates returns from an environment-sensing waveform in accordance with some embodiments of the present invention. Returns 324 may correspond to returns 124 (FIG. 1) and includes example peaks 302 illustrating clutter. FIG. 3B illustrates clutter-orthogonal waveforms in accordance with some embodiments of the present invention. Waveform 333 may correspond to a waveform generated before quantization of clutter-orthogonal vector 133 (FIG. 1), which may have been selected as the lowest return energy level vector from the V matrix. Waveform 335 may correspond to a waveform generated from the selection of the highest return energy level vector from the V matrix. Waveforms 336 and 338 illustrate the amplitude components of waveforms 333 and 335 after quantization.

Figure 4:
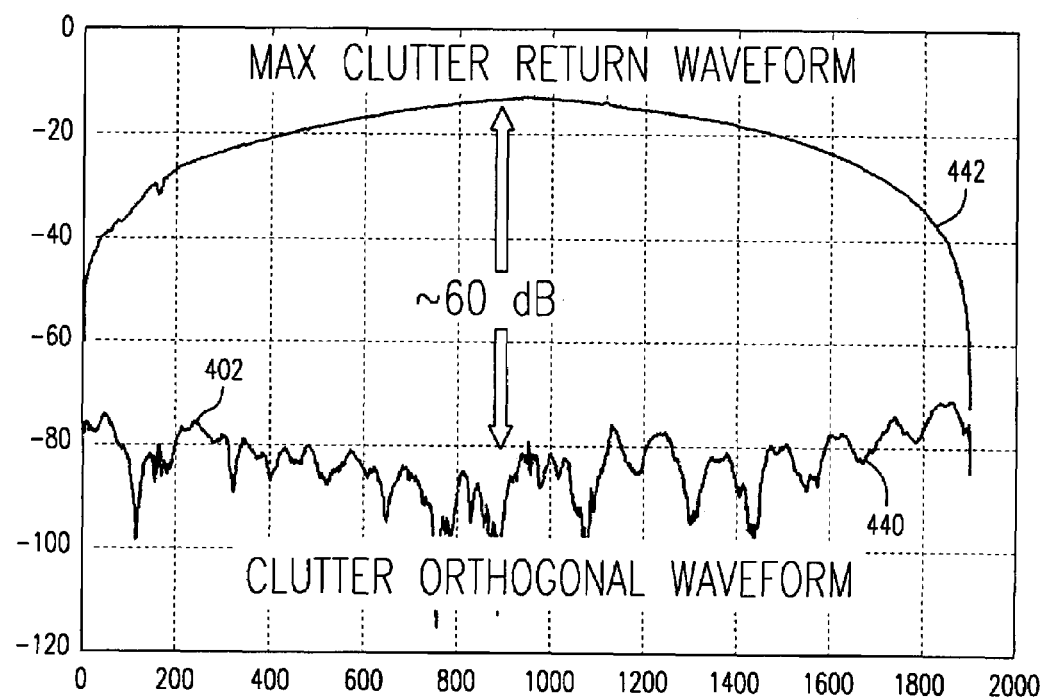
FIG. 4 illustrates peak and null clutter-orthogonal waveforms in accordance with some embodiments of the present invention.

FIG. 4 illustrates peak and null clutter-orthogonal waveforms in accordance with some embodiments of the present invention. Waveform 440 may illustrate the radar return of a clutter-orthogonal transmit waveform, such as waveform 333 (FIG. 3B), which may be referred to as a null waveform selected from the lowest return energy level vector from the V matrix. Maximum-clutter waveform 442 may illustrate the radar return of a transmit waveform selected from the highest return energy level vector from the V matrix and may correspond to transmit waveform 335 (FIG. 3B). As illustrated, waveform 440 allows clutter to be nulled an additional 60 dB in this example, and peaks 302 (FIG. 3A) at range point 402 are reduced by up to 80 dB.

Figure 5A:
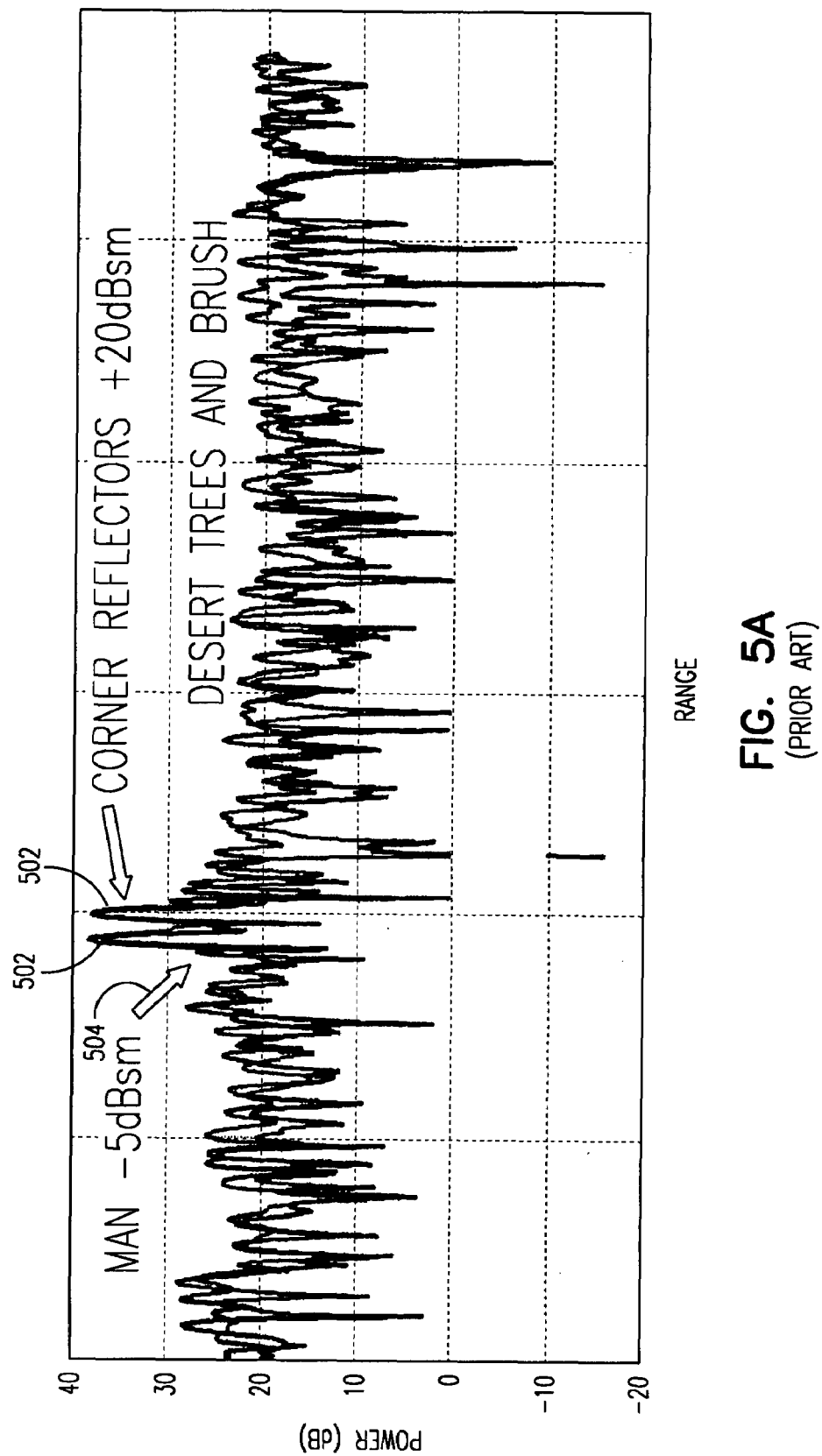
FIGS. 5A and 5B illustrate a comparison between a conventional radar system and a radar system in accordance with some embodiments of the present invention.
Figure 5B:
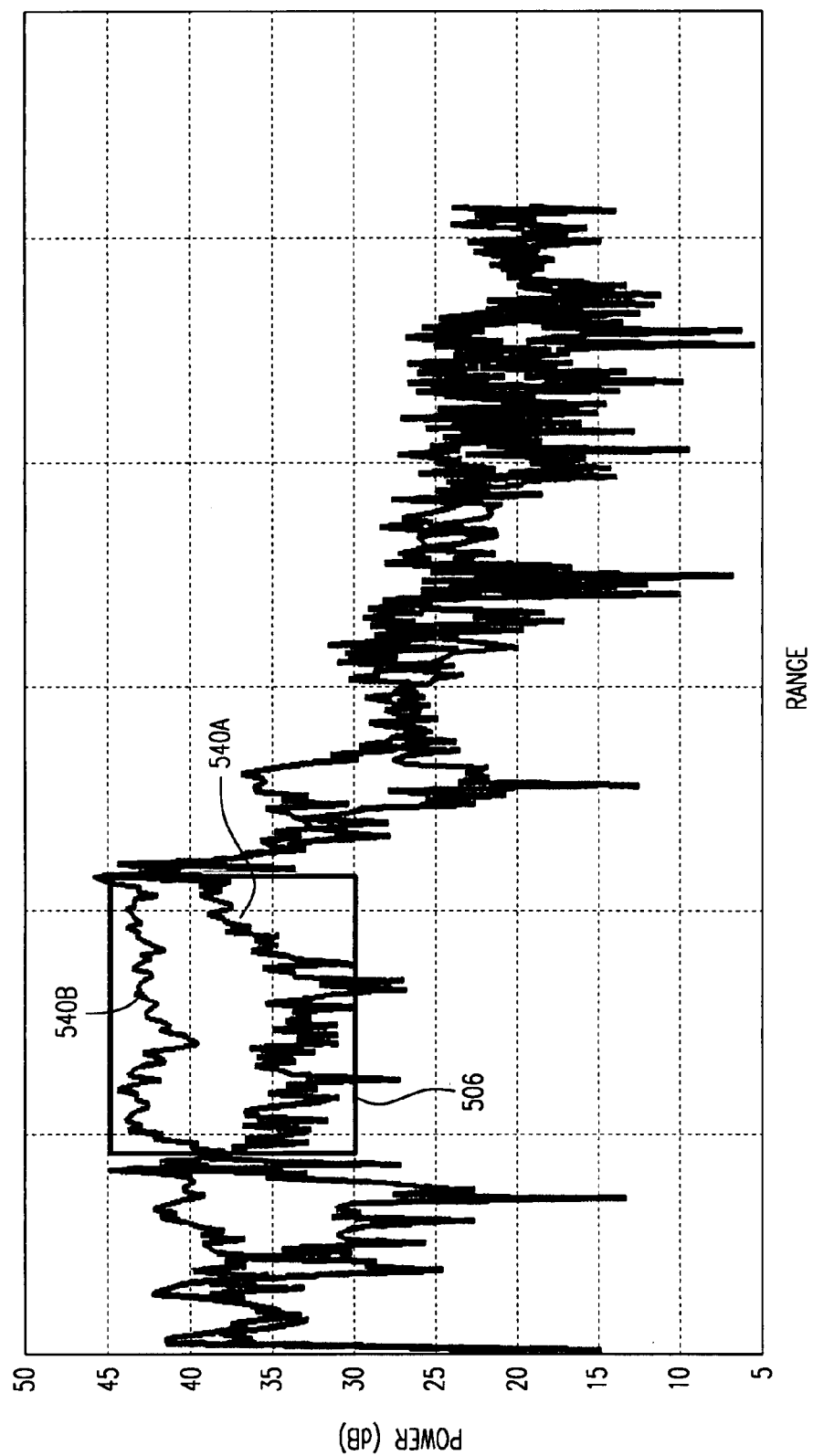

FIGS. 5A and 5B illustrate a comparison between a conventional radar system and a radar system in accordance with some embodiments of the present invention. In FIG. 5A, the illustrate radar returns of a conventional radar system. In FIG. 5A, peaks 502 represent clutter (e.g., corner reflectors in this example) and peak 504 represents a slow-moving object (e.g., a person in this example). As illustrated, a slow-moving target would be difficult, if not impossible, to detect amongst the clutter, even with A/D converters with large dynamic ranges (e.g., greater than 35 dB).

In FIG. 5B, waveforms 540A and 540B illustrate radar returns of a radar system in accordance with embodiments of the present invention. Return waveform 540A illustrates the radar return without a moving target, while return waveform 540B illustrates a return with a slow-moving object. Within range of interest 506, return waveform 540B is significantly greater than waveform 540A allowing a slow-moving target to be much more easily detected. A dynamic range of the A/D converter may be reduced by up to 20 dB or more for detection.

Thus, in accordance with embodiments, clutter may be reduced and/or cancelled using a clutter-orthogonal transmit waveform allowing a slow-moving target be detected within a high-clutter environment. For example, person moving in an urban environment, or a person moving amongst trees, shrubbery and ground clutter may easily be detected. Also a slow-moving target, such as a person or vehicle, may easily be detected behind clutter or behind an obstacle such as a wall.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Embodiments of the invention may be implemented in one or a combination of hardware, firmware and software.

Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Rather, as the following claims reflect, invention may lie in less than all features of a single disclosed embodiment. Thus the following claims are hereby incorporated into the detailed description, with each claim standing on its own as a separate preferred embodiment.

What is claimed is:

1. Signal processing circuitry for use in a radar system comprising:
    a matrix-generating element to time-reverse an order of radar return samples and to the generate a convolution matrix from the radar return samples, the radar return samples resulting from a transmission of an environment-sensing pulse; and
    a matrix-processing element to generate a plurality of return energy-ranked vectors from the convolution matrix,
    wherein one of the return energy-ranked vectors is selected for generation of a clutter-orthogonal transmit waveform.

2. The signal processing circuitry of claim 1 further comprising a correlator to perform multiple correlations on radar returns from the clutter orthogonal transmit waveform using a family of waveforms.

3. The signal processing circuitry of claim 2 wherein the family of waveforms comprises at least some vectors from a decomposition matrix generated from the convolution matrix.

4. The signal processing circuitry of claim 2 wherein the family of waveforms comprise a family of pseudo-orthogonal waveforms.

5. The signal processing circuitry of claim 1 further comprising:
    a waveform-selection element to select a clutter-orthogonal vector from the plurality of return energy-ranked vectors; and
    a quantization element to quantize the clutter-orthogonal vector for application to a phase modulator for generation of the clutter-orthogonal transmit waveform.

6. The signal processing circuitry of claim 5 wherein the quantization element quantizes the clutter-orthogonal vector by:
    setting amplitude components of the clutter-orthogonal vector to a constant-amplitude level; and
    truncating phase components of the clutter-orthogonal vector based on a resolution of a phase-modulator.

7. The signal processing circuitry of claim 6 wherein when the phase-modulator comprises a bi-phase modulator, the quantization element generates two phase components from the clutter-orthogonal vector, and
    wherein when the phase modulator comprises a polyphase modulator, the quantization element generate a plurality of phase components based on a resolution of the polyphase modulator.

8. The signal processing circuitry of claim 5 wherein the matrix-processing element performs a decomposition on the convolution matrix to generate one or more decomposition matrices, and
    wherein the waveform-selection element selects the clutter-orthogonal vector from one of the decomposition matrices, the selected vector having a lowest return energy level.

9. The signal processing circuitry of claim 8 wherein the one or more of the decomposition matrices comprise a singular-value diagonal matrix, an output singular vector matrix, and an input singular vector matrix, and
    wherein the waveform-selection element selects a vector as the clutter-orthogonal vector from the input singular vector matrix, the selected vector being associated with a lowest return energy level.

10. The signal processing circuitry of claim 5 wherein the matrix-generating element, the matrix-processing element, the waveform-selection element and the quantization element comprise one or more processing elements.

11. The signal processing circuitry of claim 1 wherein the time-reversal performed by the matrix-generating element reverses the order of the radar return samples, and
    wherein the matrix-generating element generates a convolution matrix of the radar return samples.

12. The signal processing circuitry of claim 1 wherein the radar system comprises sampling circuitry to sample the radar returns from the transmission of the environment-sensing pulse and generate the radar return samples, and
    wherein the sampling circuitry is to sample the radar returns at time-intervals corresponding to a pulse-width of the environment-sensing pulse.

13. A method of reducing effects of clutter comprising:
    time-reversing an order of radar return samples;
    generating a convolution matrix from the radar return samples, the radar return samples resulting from a transmission of an environment-sensing pulse;
    generating a plurality of return energy-ranked vectors from the convolution matrix; and
    selecting one of the return energy-ranked vectors for generation of a clutter-orthogonal transmit waveform.

14. The method of claim 13 further comprising performing multiple correlations on sampled radar returns from the clutter orthogonal transmit waveform using a family of waveforms.

15. The method of claim 14 wherein the family of waveforms comprises at least some vectors selected from a decomposition matrix generated from the convolution matrix.

16. The method of claim 14 wherein the family of waveforms comprise a family of pseudo-orthogonal waveforms.

17. The method of claim 13 wherein selecting comprises selecting a clutter-orthogonal vector from the plurality of return energy-ranked vectors, and
    wherein the method further comprises quantizing the clutter-orthogonal vector for application to a phase modulator for generation of the clutter-orthogonal transmit waveform.

18. The method of claim 17 quantizing comprises quantizing the clutter-orthogonal vector by:
    setting amplitude components of the clutter-orthogonal vector to a constant-amplitude level; and
    truncating phase components of the clutter-orthogonal vector based on a resolution of a phase-modulator.

19. The method of claim 18 wherein quantizing comprises one of either:
    generating two phase components from the clutter-orthogonal vector for application to a bi-phase modulator; and
    generating a plurality of phase components for application to a polyphase modulator based on a resolution of the polyphase modulator.

20. The method of claim 17 wherein generating the plurality of return energy-ranked vectors comprises performing a decomposition on the convolution matrix to generate one or more decomposition matrices, and
    wherein selecting comprises selecting the clutter-orthogonal vector from one of the decomposition matrices, the selected vector having a lowest return energy level.

21. The method of claim 20 wherein the one or more of the decomposition matrices comprise a singular-value diagonal matrix, an output singular vector matrix, and an input singular vector matrix, and wherein selecting comprises selecting a vector as the clutter-orthogonal vector from the input singular vector matrix, the selected vector being associated with a lowest return energy level.

22. The method of claim 17 wherein the time-reversing, the generating the convolutional matrix, the generating the plurality of return energy-ranked vectors, the selecting and the quantizing are performed by instructions operating on one or more processing elements.

23. The method of claim 13 wherein the time-reversing reverses the order of the radar return samples, and wherein generating the convolution matrix comprises generating a convolution matrix of the radar return samples.

24. The method of claim 13 further comprising:

sampling the radar returns resulting from a transmission of an environment-sensing pulse; and generating the radar return samples, wherein the sampling samples the radar returns at time-intervals corresponding to a pulse-width of the pulse.

25. A radar system comprising:

transmitter circuitry to transmit an environment-sensing pulse; and processing circuitry to time-reverse an order of radar return samples, to the generate a convolution matrix from the radar return samples resulting from the transmission of the environment-sensing pulse, and to generate a plurality of return energy-ranked vectors from the convolution matrix, wherein one of the return energy-ranked vectors is selected for generation of a clutter-orthogonal transmit waveform.

26. The system of claim 25 further comprising:

a phase modulator; and sampling circuitry, wherein the processing circuitry is to further perform multiple correlations on sampled radar returns from the clutter orthogonal transmit waveform using a family of waveforms, is to select a clutter-orthogonal vector from the plurality of return energy-ranked vectors, and is to quantize the clutter-orthogonal vector for application to the phase modulator for generation of a clutter-orthogonal transmit waveform.

27. The system of claim 26 wherein the time-reversal performed by the processing circuitry reverses the order of the radar return samples, wherein the sampling circuitry is to sample the radar returns from the transmission of the environment-sensing pulse and generate the radar return samples and is to sample the radar returns at time-intervals corresponding to a pulse-width of the environment-sensing pulse.

28. The system of claim 26 wherein the processing circuitry is to perform a decomposition on the convolution matrix to generate one or more decomposition matrices, and is to select the clutter-orthogonal vector from one of the decomposition matrices, the selected vector having a lowest return energy level.

29. The system of claim 28 wherein the one or more of the decomposition matrices comprise a singular-value diagonal matrix, an output singular vector matrix, and an input singular vector matrix, and wherein the processing circuitry is to select a vector as the clutter-orthogonal vector from the input singular vector matrix, the selected vector being associated with a lowest return energy level.

30. A machine-accessible medium that provides instructions, which when accessed, cause a machine to perform operations comprising:

time-reversing an order of radar return samples;

generating a convolution matrix from the radar return samples, the radar return samples resulting from a transmission of an environment-sensing pulse;

generating a plurality of return energy-ranked vectors from the convolution matrix; and selecting one of the return energy-ranked vectors for generation of a clutter-orthogonal transmit waveform.

31. The machine-accessible medium of claim 30 wherein the instructions, when further accessed cause the machine to perform operations further comprising performing multiple correlations on sampled radar returns from the clutter orthogonal transmit waveform using a family of waveforms, wherein selecting comprises selecting a clutter-orthogonal vector from the plurality of return energy-ranked vectors, and wherein the operations further comprise quantizing the clutter-orthogonal vector for application to a phase modulator for generation of the clutter-orthogonal transmit waveform, and wherein the time-reversing reverses the order of the radar return samples.

32. The machine-accessible medium of claim 31 wherein the instructions, when further accessed cause the machine to perform operations wherein generating the plurality of return energy-ranked vectors comprises performing a decomposition on the convolution matrix to generate one or more decomposition matrices, and wherein selecting comprises selecting the clutter-orthogonal vector from one of the decomposition matrices, the selected vector having a lowest return energy level.

33. The machine-accessible medium of claim 32 wherein the instructions, when further accessed cause the machine to perform operations wherein the one or more of the decomposition matrices comprise a singular-value diagonal matrix, an output singular vector matrix, and an input singular vector matrix, and wherein selecting comprises selecting a vector as the clutter-orthogonal vector from the input singular vector matrix, the selected vector being associated with a lowest return energy level.

* * * * *